United States Patent [19]

Koenhen et al.

[11] Patent Number: 5,207,908

[45] Date of Patent: May 4, 1993

[54] SEMI-PERMEABLE COMPOSITE MEMBRANE AND PROCESS FOR MANUFACTURING SAME

[75] Inventors: Dirk M. Koenhen, RS Dedemsvaart; Aloysius H. A. Tinnemans, BG Zeist, both of Netherlands

[73] Assignee: X-Flow B.V., AH Almelo, Netherlands

[21] Appl. No.: 711,189

[22] Filed: Jun. 5, 1991

[30] Foreign Application Priority Data

Jun. 6, 1990 [NL] Netherlands .................. 9001274

[51] Int. Cl.$^5$ ........................................... B01D 69/12
[52] U.S. Cl. ............................ 210/490; 210/500.35; 210/500.37
[58] Field of Search ............. 210/490, 500.34, 500.35, 210/500.37; 427/244, 245, 246

[56] References Cited

U.S. PATENT DOCUMENTS

| | | | |
|---|---|---|---|
| 4,769,148 | 9/1988 | Fibiger et al. | 210/500.38 |
| 4,802,984 | 2/1989 | Waite | 210/500.35 X |
| 4,913,816 | 4/1990 | Waite | 210/500.35 X |

FOREIGN PATENT DOCUMENTS

| | | |
|---|---|---|
| 0046136 | 2/1982 | European Pat. Off. . |
| 0174045 | 3/1986 | European Pat. Off. . |
| 0227043 | 7/1987 | European Pat. Off. . |

OTHER PUBLICATIONS

J. E. Cadotte et al. Sci.-Chem., vol. A15, No. 5 (1981) (New York)–Interfacial Synthesis in the Preparation of Reverse Osmosis Membranes.

*Primary Examiner*—Frank Spear
*Attorney, Agent, or Firm*—Brooks Haidt Haffner & Delahunty

[57] ABSTRACT

The invention relates to a semi-permeable composite membrane with a porous carrier substrate whereon a polymer network obtained by interfacial polymerization is applied, said network comprises an additional polymer. According to the present invention said additional polymer is dissolved in the water phase or in the organic phase, from which said interfacial polymerization occurs, which additional polymer is molecularly entangled in said network and may regulate in particular the selectivity and the permeability of the composite membrane.

Preferably the additional polymer is a non-reactive polymer.

Furthermore, the invention relates to a process for manufacturing the above-mentioned semi-permeable membrane.

6 Claims, No Drawings

SEMI-PERMEABLE COMPOSITE MEMBRANE AND PROCESS FOR MANUFACTURING SAME

The present invention relates to a semi-permeable composite membrane with a porous carrier substrate on which a polymer network obtained by interfacial polymerisation is applied, said network comprises an additional polymer and a process for manufacturing such semi-permeable membrane.

Such semi-permeable composite membrane is known from the European patent application 0 311 912. As porous carrier one uses herewith preferably a polysulphone. On the porous carrier poly-meta-phenylene tetrahydrofuran 2,3,4,5-tetracarboxamide is applied by interfacial polymerisation. Such membranes are suitable for use in aqueous systems, in particular for removing salts from aqueous solutions.

From the European patent application 0 275 027 is known that one may remove by reverse osmosis materials which are dissolved or disperged in a solution or disperging medium, wherein said materials are separated from the solvent respectively disperging medium. The membranes used herein are selective permeable for certain components of the mixture to be separated. The known processes and membranes here described are in particularly developed for separation processes in water. Herein an aqueous feed solution is brought in contact with a surface of the reverse osmosis membrane under pressure. The water permeability of the membrane is promoted by the applied pressure.

Membranes in general may be prepared from a polymer, for example polyamide, as described in the U.S. Pat. No. 4,277,344. From more recent developments it has appeared that thin film composite membranes in particular are suitable for reverse osmosis. Such membranes which have a good salt retention are described in the U.S. Pat. Nos. 4,520,044 and 4,606,943.

The U.S. Pat. No. 4,767,148 describes thin film composite membranes for reverse osmosis which membranes are manufactured by interfacial polymerisation of a polyfunctional primarily water soluble primary or secondary amine in an aqueous solution with a relatively water insoluble polyfunctional acyl halide in an organic solvent.

Thin film composite membranes are in general prepared by interfacial polymerisation. Mostly one uses reactions of polyfunctional amines with polyfunctional acid halides or polyfunctional isocyanates.

In a known process a porous carrier substrate, in general a polysulphone ultra-filtration membrane is coated with a solution of one of the components whereafter the so coated membrane is brought in contact with a solution of the other reactive component wherein the respective solvents are inmiscible.

The reaction occurs at the interface wherein a thin polymer film with separation properties is obtained.

For ultra-filtration membranes in general the membranes are manufactured by the phase inversion technique. Such membranes may also be used as carrier substates for the manufacture of thin film composite membranes.

Examples of such membranes are described in the U.S. Pat. Nos. 3,926,748 and 4,039,440.

Sometimes one uses carrier substrates with big pores like microporous polypropylene (Celgard) and membranes prepared by the process of the U.S. Pat. No. 4,798,847.

For gas separation processes there is a need for a separation layer which is as thin as possible. In general it is particularly difficult to directly obtain good results by the known processes in the manufacture of homopolymer membranes.

In this connection reference is made to the known U.S. Pat. No. 4,230,463 wherein the membrane imperfections are blocked with a coating of polyphenyl methyl siloxane.

This process is used to approach as good as possible the intrinsic polymer separation properties.

Processes for the preparation of interfacial polymerisation composite membranes from siloxane polymers are described in the U.S. Pat. No. 4,493,714.

These membranes primarily have the same properties as silicone membranes manufactured by solution deposit as described in the U.S. Pat. No. 4,581,043 with this difference that possibly the thickness of the composite layer is thinner whereby productivity may be higher.

Increase of the separation factors for gas separation comprises the use of more dense polymer structures which may be obtained by treatment of the above-mentioned membranes by plasma coating as described in the U.S. Pat. No. 2,191,502.

Composite membranes with a homogeneous coating are also used for reverse osmosis or ultra-filtration processes for the separation of solvents. A fluorine containing silicone coating is described in the U.S. Pat. No. 4,748,288.

An example of such processes for the preparation of membranes for use in pervaporation may be found in the European patent application 0 312 378.

The use of homopolymers for membrane applications has various disadvantages.

In the first place, the choice of polymers is restricted in particular in the cases where the membrane is in contact with liquids like in reverse osmosis, ultra-filtration and pervaporation. The choice herein is restricted to polymers which do not dissolve or do not excessively swell in the disperging medium or which have functional groups which are capable of causing cross-links.

So, for example, polyvinyl alcohol is only suitable as a pervaporation or reverse osmosis membrane for aqueous applications after a cross-links since otherwise the polymer would dissolve.

Another example is the use of polydimethyl siloxane as a membrane for removing lubricating oil (dewaxing) from a mixture of methyl ethyl ketone and toluene. Composite membranes with a polydimethyl siloxane coating show in such medium a too excessive swelling whereby they cannot be used. To avoid this problem one should, for example, use a fluorized siloxane polymer.

The use of interfacial polymerisation is also restricted since the used monomers or prepolymers always should contain polyfunctional reactive groups which may react at the interface.

The present invention aims to use a great number of polymers as membrane material, also in those cases where they cannot be provided with reactive groups or where they will swell excessively or dissolve in the disperging medium respectively solvent with retainment of the possibility of obtaining extremely thin membrane layers.

The present invention provides a semipermeable composite membrane with a porous carrier substrate whereon a polymer network obtained by interfacial polymerisation is applied, said network comprises an additional polymer, characterized in that said additional polymer is dissolved in the water phase or in the organic phase, from which said interfacial polymerisation occurs, which additional polymer is molecularly entangled in said network and may regulate in particular the selectivity and the permeability of the composite membrane.

The additional polymer present in the network may provide that the respective semi-permeable composite membrane, for example, has good fluxes since the said additional polymer shows a good solubility or swelling, which polymer usually would not be suitable for the manufacture of membranes. In the manufacture of the present membranes the additional present polymer is dissolved in one of the two solutions for the manufacture of the membrane by interfacial polymerisation.

Furthermore it is noted that surprisingly it has appeared that the first-mentioned additional polymer not only provides an instrument to influence the flux but also the retention which membrane properties are of great importance in the used separation processes.

The additional polymer present in the polymer network preferably is a non-reactive polymer, though it is conceivable that for certain applications of the semi-permeable composite membrane of the invention the additional polymer is reactive.

As non-reactive polymer one uses preferably polyalkyl siloxane either branched or not with the formula

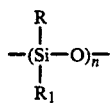

wherein R and $R_1$ independent of each other represent a $C_1$-$C_{20}$ alkyl or aryl group either substituted or not and n is an integer of 20-50,000 or a copolymer thereof.

The polyalkyl siloxane of the invention preferably is a polydimethyl siloxane with terminal trimethyl silyl groups.

In another favourable embodiment of the semipermeable composite membrane of the invention the non-reactive polymer is a polyacrylate or polymethacrylate with the formula

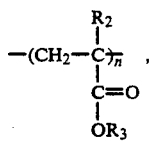

wherein $R_2$=H or $CH_3$ and $R_3$ is alkyl with 1-20 carbon atoms either branched or not, while n is an integer of $\geq 10$.

Another favourable non-reactive polymer is a polyolefin either branched or not like for example polyisobutylene, polyisoprene or polybutadiene.

Further favourable non-reactive polymers are for example a block copolymer of styrene-butadiene-styrene, styrene-isoprene-styrene, styrene-ethylene-butylene etc.

Furthermore, according to the invention a cellulose acetate also appears to be favourable as non-reactive polymer in the scope of the invention.

Finally, it appears that a polyalkylene oxide, in particular polyethylene oxide with the formula $(CH_2-CH_2-O)_n$, wherein n is an integral of $\geq 20$ gives good results when this non-reactive polymer is present in the semi-permeable composite membrane.

In general the polymer regulating the membrane properties is present in the polymer network in a quantity of 5-90%, by weight, and preferably in a quantity of 10-60%, by weight, related to the total weight of the network.

Finally, the invention comprises a process for the manufacture of a semi-permeable membrane by coating a porous substrate with a polymer network obtained by interfacial polymerisation, characterized in that the porous substrate is treated with a solution of at least a reactive polyfunctional monomer or oligomer or prepolymer with as reactive groups —$NHR_4$ ($R_4$=H or alkyl with $C_1$-$C_{20}$), —OH or —SH and eventually a surfactant in water, whereafter the so treated substrate is further treated with a solution of at least one reactive polyfunctional monomer or oligomer or prepolymer or polymer with as reactive groups —COX, —$SO_2$X, —$POXR_5$, —$NR_6COX$ or —NCO, wherein X=Cl, Br or I, while $R_5$ and $R_6$ are an alkoxy group or alkyl group with 1-16 carbon atoms, preferably 1-5 carbon atoms in a suitable organic solvent wherein a polymer regulating the membrane properties, prior to the treatment of the substrate with the aqueous solution of the said reactive components is added to that solution in case the polymer is soluble in water, whereas in case the polymer dissolves in an organic solvent, this is added to the organic solution of the said reactive components whereafter the so treated substrate is dried and subsequently is or is not subjected to a heat treatment.

It is noted that in the preparation of the semipermeable membrane of the invention the respective porous substrate is coated with a polymer network obtained by interfacial polymerisation starting from two phases, namely an organic phase with therein a reactive component as above-mentioned and an aqueous phase containing a water soluble reactive component which form after contacting each other a network. Prior to the interfacial polymerisation an additional polymer, usually a non-reactive polymer, is added to one of the phases which polymer is captured in the network obtained by interfacial polymerisation and cross-links.

The additional polymer, usually a non-reactive polymer, is insolubilized in the network wherein the swelling in the network is restricted to a value dictated by the network formed by the interfacial polymerisation reaction.

An additional advantage is that a particularly thin separation layer is formed which is difficult to obtain with other techniques like dip-coating or "kiss-roll"-coating. An eventual polymer surplus can be removed by washing with a suitable solvent, while a thin layer of the desired polymer remains entangled in the formed network.

In examining the reverse osmosis membranes for the separation of n-docosane from hexane, for example, it has appeared that when using a prepolymer of Polymeg (=poly(tetramethylene ether glycol)) with final isocyanate groups in the organic phase and an amine in a water phase under addition of a non-reactive polymer in the form of silicone to the organic phase the molecular weight of the Polymeg is of importance.

When using Polymeg with a molecular weight of 650 no flux could be observed, whereas the use of Polymeg with a molecular weight of 1.000 gave good results concerning the flux. When using Polymeg with a molecular weight of 2.000 very high fluxes were obtained but with a decrease of the retention.

From the foregoing it appears clearly that the density of the network wherein the silicone is captured is of importance. It is surprising that the fluxes strongly may be increased by adding siloxane in a dense network with retainment of the desired retention values.

However, when the network is too loose like for example with Polymeg 2.000 the silicone may swell too much thereby losing its performance.

When to a network built from an isocyanate terminated polydimethyl siloxane and a low molecular amine, which network has per se gas separation properties similar to normally used PDMS layers, an addition of poly(1-(trimethyl silyl)-1-propyn is done, it is observed that the gas permeability strongly increases whereas the separation factor decreases somewhat. Here the permeability primarily is determined by the added polymer showing a 10×higher permeability in relation to a polymer known from the literature.

By the present cross-links process these membranes are also suitable for membrane application entirely or partially taking place in a liquid medium.

It has surprisingly appeared that by the present process various polymers may be used which otherwise are unsuitable for the manufacture of a membrane provided one combines these polymers with a membrane network obtained by interfacial polymerisation. The so formed effective layers are extremely thin in the order of magnitude of 0.05-0.5 μm, which membranes are particularly suitable for the manufacture of gas separation membranes.

It is noted that the present membranes are particularly suitable for various separation purposes like reverse osmosis, gas separation, separation of organic liquids and for separation aqueous solutions.

The following non-reactive polymers are suitable for use for reverse osmosis in aqueous systems:

sulphonated polymers like sulphonated polysulphone, sulphonated polyether sulphone, sulphonated polyphenylene oxide, sulphonated polyvinylidene difluoride, sulphonated polyether ether ketone;

mixed cellulose esters like cellulose acetate butyrate (CAB), partially hydrolized CAB;

ethyl cellulose.

The polymers are dissolved in the organic phase or the water phase. As long as the polymers satisfy this solubility requirement they may be used in principle.

For non-reactive polymers which are not soluble in solvents used in the interfacial polymerisation like aromatic polyamides, polypiperazine amides, polyhydrazides, polybenzimidazoles, etc. the possibility exists of still adding them by effecting such modification on the polymer that they show a suitable solubility in the organic phase or in the water phase.

The use of polymers in for example the water phase like for example for Nafion copolymers in an alcohol/water mixture also offers a possibility of introducing the polymer in the network obtained by interfacial polymerisation.

Examples of non-reactive polymers for reverse osmosis in non-aqueous systems are those already having a high affinity for the medium to be used in the reverse osmosis non-aqueous application:

Elastomers with a high affinity relative to for example toluene like polyether urethanes, polyisobutylenes, polybutadienes, chlorinated polythenes, sulphonated polythenes, acrylic elastomers, polyepichlorhydrines, styrene butadiene rubber, butyl rubber, isoprene rubber, ethylene propylene rubber, neoprene rubber, chloroprene rubber, silicone rubber, urethane rubber;

thermoplasts with a high affinity relative to for example toluene like polystyrene, chlorinated polyvinyl chloride;

polymers with a high affinity for alcohols (methanol, ethanol, butanol); the polymers should be soluble or dispersible in the water phase or in the organic phase, for example:

poly-N-methyl-N-vinyl acetamide soluble in the water phase;

poly(N,N-dimethyl acrylamide) soluble in methanol and with water at 40° C. as water phase;

poly(methyl tert. butyl fumarate) soluble in methanol and with benzene or chloroform as organic phase;

poly(N-(1,1-dimethyl-3-oxobutyl)acrylamide) soluble in butanol and with toluene as organic phase;

poly(isobutyl methacrylate) soluble in ethanol (hot) and in isopropanol above 23,7° C. and with tetrachloro methane or n-hexane as organic phase.

When using the membranes for pervaporation purposes suitable polymers like polyurethane urea may be used as non-reactive polymer.

When using the membranes for gas separation gas separation properties of the added polymer may be called for, for example, supposing that the polymer is present as a thin separation layer, whereas the network polymer is badly permeable or impermeable for the gasses and is located in the separation layer or is located under the separation polymer layer and also is permeable for the gasses (not gas selective).

Also exists the possibility that the polymer hardly can form a solid aggregate state with own polymer chains but aggregate formation occurs with the polymer segments of the network.

Of certain elastomers it is difficult to obtain thin coating layers on microporous backgrounds by dip-coating. Baker et al. [J. Membrane Sci., 31 (1987) 259] state this for the elastomers: chloroprene, chloro sulphonated polythene (Hypalon) soluble in toluene, Fluorel, fluoro elastomer, polyacrylonitrile butadienes, silicone polycarbonate (General Electric Co.), e.g. "a sticky, rubbery material such as Hypalon is very difficult to manufacture into defect-free films.", page 270.

Trichloro ethane/$N_2$ or acetone/$N_2$ vapor mixtures lend themselves for separation with Hypalon. Addition of Hypalon to a polyurethane network perhaps leads to gas separation membranes therefor.

Under the term "retention" should be understood a value obtained by the following equation:

Retention substance $X$ (in %) =

$$\left(1 - \frac{\text{concentration substance } X \text{ in the permeate}}{\text{concentration substance } X \text{ in the feed}}\right) \times 100$$

Under the term "flux" should be understood the quantity of permeate in liters passed by the membrane per m² during one hour at a certain working period.

The invention is further explained by the following non-limiting examples.

EXAMPLE I

In a 1 liter round bottom provided with a distillation mount and a needle guide with a rubber septum were introduced 9.1 g (7.8 mmoles) poly(tetramethylene ether glycol) (Polymeg 1000 ®), Quaker Oats Co.; OH contents 1.73 mmoles/g) and 915 ml toluene (pro analyse, Merck). From this solution under nitrogen atmosphere about 240 ml of a mixture of toluene and water was removed by azeotropic distillation. Subsequently, the distillation mount was replaced by a reflux condenser while the solution remained under nitrogen atmosphere. To this solution were successively added by a syringe 2.75 g (15.8 mmoles) toluene isocyanate. (T-80 ®, Bayer), i.e. molar ratio Polymeg 1000/T-80=½ and 0.09 g [$CH_3(CH_2)_{10}CO_2$]$_2$ Sn[$(CH_2)_3CH_3$]$_2$ as catalyst. Subsequently, the reaction mixture was stirred during 3.5 hours at 65°–70° C. The resulting yellow brown solution contained 2.0%, by weight, prepolymer and a free toluene diisocyanate contents of about 15% (on the basis of GPC analysis after modification with di-n-butyl amine).

A wet flat support membrane of polyimide (0.35×0.12 m) prepared from a 16%, by weight, solution of a polyimide type (Lenzing P84) in DMF was applied to a cylindrical immersion body made of teflon. This support membrane was immersed during 15 minutes in a water phase with 1.0%, by weight, $NH_2$—$CH_2CH_2CH_2$—NH—$CH_2CH_2$—NH—$CH_2CH_2CH_2$—$NH_2$, 0.05%, by weight, poly(vinyl alcohol) (Mowiol 4-88 ®, Hoechst) and 0.04%, by weight, sodiumdodecyl sulphate as surfactant. Subsequently, the membrane was removed from the water phase and the excess of aqueous solution at the lower side was removed with filtering paper. After a dripping period of about 7 minutes the membrane was transferred in an organic phase comprising toluene with therein dissolved 0.5%, by weight, above-mentioned prepolymer and as additional non-reactive polymer 0.75 g of a poly(dimethyl siloxane) with terminal trimethyl silyl groups (Ak-Öl 100.000, Wacker Chemie) per gram prepolymer. The membrane was in the organic phase during 1 minute. Subsequently, the membrane was dried 5 minutes at room temperature and thereafter 15 minutes in an air circulation oven at 90° C. The obtained membrane contained a polymer network with therein entangled the non-reactive Ak-Öl.

The reverse osmosis properties of this membrane were determined at room temperature and at a pressure of 40 bar in a solution comprising n-hexane with therein dissolved 1.0%, by weight, n-docosane (molar mass 310.6 dalton) with as result a n-hexane flux of 52 l/m$^2$/h and a n-docosane retention of 73%.

COMPARATIVE EXAMPLE IA

The procedure of example I was repeated on the understanding that the organic phase did not contain Ak-Öl. This membrane did not show n-hexane flux in a reverse osmosis experiment as described in example I.

From the foregoing appears clearly the favourable effect of the non-reactive polymer Ak-Öl on the hexane flux and n-docosane retention.

EXAMPLE II

In an analogous manner as described in example I a 3.26%, by weight, solution was prepared of a prepolymer prepared from toluene diisocyanate (T-80) and a polybutadiene with final hydroxyl groups (PBD 2000, Poly Sciences; OH contents 1.25 mmoles/g). Subsequently, in the manner described in example I a composite membrane was prepared. The water phase contained 0.5%, by weight, of the amine. The organic phase comprised toluene with therein dissolved 2.0%, by weight, of above-mentioned prepolymer on the basis of PBD 2000 and 0.75 g Ak-Öl as non-reactive polymer per gram prepolymer.

The reverse osmosis properties of this membrane were determined at room temperature and at a pressure of 40 bar in a solution comprising toluene with therein dissolved 1.0%, by weight, n-docosane with as result a toluene flux of 97 l/m$^2$/h and a n-docosane retention of 53%.

COMPARATIVE EXAMPLE IIA

The procedure of example II was repeated on the understanding that the organic phase did not contain Ak-Öl. This membrane did not show toluene flux in a reverse osmosis experiment as described in example II.

From examples II and IIA appears the favourable effect of the non-reactive polymer Ak-Öl on the toluene flux and n-docosane retention.

EXAMPLE III

One proceeds in the manner described in example I in the preparation of a series of composite membranes (IIIa–IIId). The organic phase comprised toluene with therein dissolved 1.0%, by weight, of the prepolymer mentioned in example I and 0.75 g per gram polymer of one of the non-reactive polyolephines mentioned in table A. The results of the flux and retention capabilities of a solution of 1.0%, by weight, n-docosane in toluene at room temperature and at a pressure of 40 bar are mentioned in table A.

COMPARATIVE EXAMPLE IIIA

The procedure of example III was repeated on the understanding that the organic phase only comprised 1.0%, by weight, of the prepolymer mentioned in example I. The results of the flux and retention measurements of a solution of 1.0%, by weight, n-docosane in toluene and at room temperature at a pressure of 40 bar are mentioned in table A.

When comparing the results of example III and IIIA it appears that the non-reactive polymer namely polyolefin has a significant influence on the n-docosane retention and toluene flux.

EXAMPLE IV

In an analogous manner as described in example I a 3%, by weight, solution of a prepolymer was prepared from toluene diisocyanate (T-80) and polypropylene glycol (PPG 1000, Janssen Chimica, Belgium; OH contents 1.89 mmoles/g). Subsequently, in the manner described in example I a composite membrane was prepared. The organic phase comprised toluene with therein dissolved 1.0%, by weight, of above-mentioned prepolymer in the basis of PPG 1000 and as non-reactive polymer 0.75 g Ak-Öl per gram prepolymer.

The reverse osmosis properties of this membrane were determined at room temperature and at a pressure of 40 bar in a solution comprising n-hexane with therein dissolved 1.0%, by weight, n-docosane with as result a n-hexane flux of 123 l/m$^2$/h and a n-docosane retention of 73%.

COMPARATIVE EXAMPLE IVA

The procedure of example IV was repeated on the understanding that the organic phase did not contain Ak-Öl. This membrane did not show n-hexane flux in a reverse osmosis experiment as described in example IV.

The mentioned examples IV and IVA clearly demonstrate the influence of the non-reactive polymer on the n-hexane flux and n-docosane retention.

EXAMPLE V

An isocyanate terminated prepolymer was prepared from hydroxyl terminated polymer-α,w-bis(hydroxy propyl)polydimethyl siloxane in the manner in examples I to IV.

In the usual manner a composite membrane was made on a suitable carrier.

To the organic phase in toluene was added as non-reactive polymer 1 g fluoro silicone (Shin-Etsu X31-699) per gram prepolymer.

The water phase comprised 1%, by weight, N4 (=N,N'-bis-(3-amino propyl ethylene diamine) with the usual additions.

As a control a membrane was made without the addition of fluoro silicones (comparative example VA).

Tests on a mixture of 33% spindle oil, 33% methyl ethyl ketone and 33% toluene gave the following results at a temperature of 25° C. and a pressure of 40 bar:

|  | flux (1/m$^2$/h) | retention spindle oil |
| --- | --- | --- |
| Example V | 62.5 | 99.5% |
| Example VA | 70 | 80% |

From this example it appears that by adding fluoro silicones as non-reactive polymer to the membrane the retention of spindle oil is 99.5% in relation to 80% without addition. The flux, however, is somewhat lower, namely 62.5 in relation to a membrane without addition, namely 70, but still sufficient for a justified operation.

EXAMPLE VI

The procedure of example I was repeated on the understanding that the organic phase comprised toluene with therein dissolved 1.0%, by weight, of the prepolymer mentioned in example I and 0.75 g per gram prepolymer of a copolymer built from 80%, by weight, isobutyl methacrylate and 20%, by weight, methyl methacrylate. The results of the flux and retention measurements of a solution of 1.0%, by weight, n-docosane in toluene at room temperature and at a pressure of 40 bar are mentioned in table A.

TABLE A

| Example | Additional non-reactive polymer 0.75 g/g prepolymer | Toluene flux 1/m$^2$/h | Retention n-docosane |
| --- | --- | --- | --- |
| IIIA | none | 204 | 60 |
| IIIa | Oppanol B50[a] | 73 | 85 |
| IIIb | Cariflex TR 1101[b] | 67 | 89 |
| IIIc | Kraton G 1605[c] | 31 | 91 |
| IIId | Cariflex TR 1107[d] | 68 | 84 |
| VI | see example VI | 24 | 88 |

[a]Poly(isobutylene) M.W. = 400.000 (BASF)
[b]Styrene-butadiene-styrene-block copolymer (Shell)
[c]Styrene-ethylene/butylene-styrene-block copolymer (Shell)
[d]Styrene-isoprene-styrene-block copolymer (Shell)

This example demonstrates the favourable effect of the non-reactive polymer on the retention of n-docosane at a decrease of the flux to a value which in economic aspect is totally acceptable.

EXAMPLE VII

The procedure of example I was repeated on the understanding that the water phase contained 0.5%, by weight, of the amine. The organic phase comprised toluene with therein dissolved 1.0%, by weight, of the prepolymer mentioned in example I and as non-reactive polymer 0.75 g poly(ethylene oxide), (M.W. 100.000, Aldrich) per gram prepolymer.

The reverse osmosis properties of this membrane were determined at room temperature and at a pressure of 40 bar in an aqueous solution with 1.0%, by weight, sucrose with as result a water flux of 24 kg/m$^2$/h and a sucrose retention of 60%.

EXAMPLE VIII

The procedure of example I was repeated. The water phase comprised besides 0.5%, by weight, NH$_2$—CH$_2$CH$_2$CH$_2$—NH—CH$_2$CH$_2$—NH—CH$_2$CH$_2$CH$_2$—NH$_2$, 0.05%, by weight, poly(vinyl alcohol) (Mowiol 4-88®, Hoechst) and 0.04%, by weight, sodium dodecyl sulphate as surfactant. As non-reactive polymer 0.75 g cellulose acetate per gram used prepolymer was added to the organic phase. The organic phase comprised toluene and dissolved therein 0.5%, by weight, of the prepolymer mentioned in example I.

The reverse osmosis properties of this membrane were determined at room temperature and a pressure of 40 bar in an aqueous solution with 0.1%, by weight, NaCl with as result a water flux of 15 kg/m$^2$/h and a NaCl retention of 80%.

COMPARATIVE EXAMPLE VIIIA

The procedure of example VIII was followed on the understanding that no cellulose acetate was used. This membrane did not show water flux in a reverse osmosis experiment as described in example VIII.

EXAMPLE IX

The procedure of example I was followed in the preparation of a series of composite membranes (IXa-IXc). The organic phase comprised toluene with therein dissolved 1.0%, by weight, of the prepolymer mentioned in example I and as non-reactive polymer a quantity of Ak-Öl varying from 0, 0.75 to 0.98 g per gram prepolymer, respectively.

The reverse osmosis properties of these membranes were determined at room temperature and at a pressure of 40 bar in a solution comprising n-hexane with therein dissolved 1.0%, by weight, n-docosane. The results are mentioned in table B.

TABLE B

| Example | Non-reactive polymer Ak-öl g/g prepolymer | n-Hexane flux 1/m$^2$/h | Retention n-docosane |
| --- | --- | --- | --- |
| IXa | none | 0 |  |
| IXb | 0.75 | 27 | 72 |
| IXc | 0.98 | 52 | 71 |

From table B appears the favourable effect of the used non-reactive polymer on the flux.

EXAMPLE X

The procedure of example I was repeated in the preparation of a series of composite membranes (Xa–Xd). The organic phase comprised toluene with therein dissolved 1.0%, by weight, of the prepolymer and as non-reactive polymer a quantity of Ak-Öl varying from 0, 0.25, 0.50 and 0.75 g per gram prepolymer, respectively.

The reverse osmosis properties of these membranes were determined at room temperature and at a pressure of 40 bar in a solution comprising toluene with therein dissolved 1.0%, by weight, n-docosane. The results are mentioned in table C.

TABLE C

| Example | Non-reactive polymer Ak-öl g/g prepolymer | Toluene flux $l/m^2/h$ | Retention n-docosane |
|---|---|---|---|
| Xa | none | 17 | 84 |
| Xb | 0.25 | 45 | 85 |
| Xc | 0.50 | 49 | 80 |
| Xd | 0.75 | 68 | 77 |

From comparing the results of example X it appears that as the concentration of the non-reactive polymer Ak-Öl in the organic phase increases the toluene flux of the resulting membrane increases at nearly constant retention.

EXAMPLE XI

An isocyanate determined prepolymer prepared from α,w-bis(hydroxyl propyl)polydimethyl siloxane (OF 1025; Goldschmidt; M. W. 2185) and toluene diisocyanate (T-80) in a ½ molar ratio was used in a quantity of 1.24%, by weight, in the organic phase, namely: 1,1,2-trichloro trifluoro ethane (s.w. 1.575).

In the water phase 1%, by weight, N4 (=N,N'-bis-(3-amino propyl ethylene diamine) was used.

As carrier membrane was used a polyimide type prepared from a 16%, by weight, solution (Lenzing P84) in DMF. Addition of 1 g poly-1-(trimethyl silyl)-1-propyn (PMSP) as non-reactive polymer per gram prepolymer in the organic phase led to modified measurement values for the pressure normalized $N_2$ and $O_2$ flux values of the composite membrane. The results are mentioned in table D.

TABLE D

| Prepolymer %, by weight | Non-reactive polymer g/g prepolymer | N4 water phase %, by weight | Organic phase solvent | P/l ($N_2$) mole/$m^2 \cdot s \cdot Pa$ ($cm^3$ [STP]/ $cm^2 \cdot s \cdot cm$ Hg) | $O_2/N_2$ |
|---|---|---|---|---|---|
| 1,24 | — | 1,0 | freon | $9,3 \cdot 10^{-8}$ $(2,78 \cdot 10^{-4})$ | 2,20 |
| 1,24 | 1,0 | 1,0 | toluene | $7,3 \cdot 10^{-7}$ $(2,19 \cdot 10^{-3})$ | 1,60 |

EXAMPLE XII

In an analogous manner as described in example I a composite membrane was prepared wherein in the water phase 0.2%, by weight, $H_2N-CH_2CH_2CH_2-NH-CH_2CH_2-NH-CH_2CH_2CH_2-NH_2$, 0.05%, by weight, poly(vinyl alcohol) (Mowiol 4-88 ®, Hoechst) and 0.04%, by weight, sodium dodecyl sulphate were used. The organic phase comprised toluene with therein dissolved 0.5%, by weight, toluene diisocyanate (T-80, Bayer) and as non-reactive polymer 0.75 g Ak-Öl per gram T-80.

The reverse osmosis properties of this membrane were determined at room temperature and at a pressure of 40 bar in a solution comprising toluene with therein dissolved 1.0%, by weight, n-docosane with as result a toluene flux of 37 $l/m^2/h$ and a n-docosane retention of 63%.

COMPARATIVE EXAMPLE XIIA

The procedure of example XII was repeated. The organic phase did not contain Ak-Öl. This membrane showed a toluene flux of 16 $l/m^2/h$ and a n-docosane retention of 33%.

From examples XII and XIIA appears the favourable influence of the non-reactive polymer on the flux and the retention.

We claim:

1. A semi-permeable composite membrane with a porous carrier substrate whereon a polymer network obtained by interfacial polymerisation is applied, said network comprises an additional polymer characterized in that said additional polymer is dissolved in the water phase or in the organic phase, from which said interfacial polymerisation occurs, which additional polymer is molecularly entangled in said network and may regulate in particular the selectivity and the permeability of the composite membrane, and, said polymer is a non-reactive polymer selected from the group consisting of a polyalkyl siloxane either branched or not with the formula

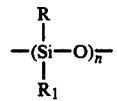

wherein R and $R_1$ independent of each other represent $C_1$-$C_{20}$ alkyl or alkyl group either substituted or not and n is an integral of 20–50,000 or a copolymer thereof, a polyacrylate or methacrylate with the formula

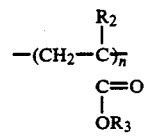

wherein $R_2$=H or $CH_3$ and $R_3$ is an alkyl group either branched or not with 1–20 carbon atoms, while n is an integer of $\geq 10$, cellulose acetate, and a polyethylene oxide of the formula $(CH_2-CH_2-O)_n$ wherein n is an integer of $\geq 20$.

2. A semi-permeable composite membrane of claim 1, characterized in that the non-reactive polymer is a polyalkyl siloxane either branched or not with the formula

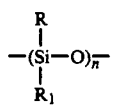

wherein R and $R_1$ independent of each other represent a $C_1$–$C_{20}$ alkyl or alkyl group either substituted or not and n is an integral of 20–50,000 or a copolymer thereof.

3. A semi-permeable composite membrane of claim 2, characterized in that the polyalkyl siloxane is a polydimethyl siloxane with terminal trimethyl silyl groups.

4. A semi-permeable composite membrane of claim 1, characterized in that the non-reactive polymer is a polyacrylate or polymethacrylate with the formula

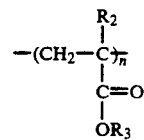

wherein $R_2$=H or $CH_3$ and $R_3$ an alkyl either branched or not with 1–20 carbon atoms, while n is an integer of $\geq 10$.

5. A semi-permeable composite membrane of claim 1, characterized in that the non-reactive polymer is cellulose acetate.

6. A semi-permeable composite membrane of claim 1, characterized in that the non-reactive polymer is a polyalkylene oxide, in particular polyethylene oxide with the formula $(CH_2-CH_2-O)_n$, wherein n is an integer of $\geq 20$.

* * * * *